(12) United States Patent
Suzuki et al.

(10) Patent No.: US 7,139,414 B1
(45) Date of Patent: Nov. 21, 2006

(54) METHOD FOR REMOVING STATIC ELECTRICITY IN FINGERPRINT-READING APPARATUS, FINGERPRINT READING APPARATUS AND DATA TERMINAL PROVIDED WITH FINGERPRINT-READING APPARATUS

(75) Inventors: Kiyoshi Suzuki, Sizuoka (JP); Osamu Suzuki, Sizuoka (JP)

(73) Assignee: NEC Corporation, Tokyo (JP)

( * ) Notice: Subject to any disclaimer, the term of this patent is extended or adjusted under 35 U.S.C. 154(b) by 1217 days.

(21) Appl. No.: 09/597,239

(22) Filed: Jun. 20, 2000

(30) Foreign Application Priority Data

Jun. 24, 1999 (JP) .................................. 11-177837

(51) Int. Cl.
*G06K 9/00* (2006.01)

(52) U.S. Cl. .................. 382/126; 382/115; 340/5.52; 340/5.82

(58) Field of Classification Search ................ 382/116, 382/124, 126, 140, 312, 313, 115; 283/68, 283/69, 78; 340/5.52, 5.53, 5.82, 5.83; 396/15; 713/186
See application file for complete search history.

(56) References Cited

U.S. PATENT DOCUMENTS

| | | | | |
|---|---|---|---|---|
| 5,429,006 A | * | 7/1995 | Tamori .................. | 73/862.046 |
| 5,446,290 A | * | 8/1995 | Fujieda et al. ............. | 250/556 |
| 5,635,723 A | * | 6/1997 | Fujieda et al. ............. | 250/556 |
| 5,862,248 A | * | 1/1999 | Salatino et al. ............. | 382/124 |
| 6,002,786 A | * | 12/1999 | Hallibert et al. ............ | 382/124 |
| 6,069,970 A | * | 5/2000 | Salatino et al. ............. | 382/124 |
| 6,088,585 A | * | 7/2000 | Schmitt et al. ............. | 455/411 |
| 6,098,330 A | * | 8/2000 | Schmitt et al. ............. | 42/70.11 |
| 6,180,989 B1 | * | 1/2001 | Bryant et al. ............... | 257/414 |
| 6,181,808 B1 | * | 1/2001 | Fukuzumi .................. | 382/126 |
| 6,246,566 B1 | * | 6/2001 | Glenn ........................ | 361/220 |
| 6,259,804 B1 | * | 7/2001 | Setlak et al. ................ | 382/124 |

(Continued)

FOREIGN PATENT DOCUMENTS

JP      60-097420       5/1985

(Continued)

OTHER PUBLICATIONS

Japanese Office Action, dated May 22, 2001, with English language translation of Japanese Examiner's comments.

*Primary Examiner*—Samir Ahmed
*Assistant Examiner*—Yosef Kassa
(74) *Attorney, Agent, or Firm*—Whitham, Curtis, Christofferson & Cook, PC (57) ABSTRACT

A data terminal is composed a main body provided with a fingerprint-reading apparatus and a main cover provided with a display. The main cover shields the fingerprint-reading apparatus when the data terminal is not used, and opens to expose the display bringing a side thereof into contact with the main body when the data terminal is used. The fingerprint-reading apparatus is composed of a fingerprint-reading portion on which a finger print is read in a state that a finger is put thereon, a cover for closing the fingerprint-reading portion and a plate on which a user puts his finger to open the cover. The plate is formed of conductive material, and connected with the ground. When the user opens the cover, he puts his finger on the plate, and static electricity stored on his finger is conducted to the ground. Accordingly, static electricity stored on his finger is removed in a state that the user is not aware of his action for removing static electricity stored on his finger during his movement for putting his finger on a fingerprint-reading portion, hence the fingerprint-reading apparatus is prevented from operating wrongly or being damaged.

20 Claims, 4 Drawing Sheets

U.S. PATENT DOCUMENTS

| | | | |
|---|---|---|---|
| 6,307,258 B1 * | 10/2001 | Crane et al. | 257/680 |
| 6,310,683 B1 * | 10/2001 | Fujiwara et al. | 356/71 |
| 6,346,739 B1 * | 2/2002 | Lepert et al. | 257/532 |
| 6,414,297 B1 * | 7/2002 | Sasaki et al. | 250/214 R |
| 6,472,246 B1 * | 10/2002 | Thomas et al. | 438/64 |
| 6,490,366 B1 * | 12/2002 | Haneda et al. | 382/126 |
| 6,628,812 B1 * | 9/2003 | Setlak et al. | 382/124 |
| 6,970,584 B1 * | 11/2005 | O'Gorman et al. | 382/126 |

FOREIGN PATENT DOCUMENTS

| | | |
|---|---|---|
| JP | 3-100457 | 10/1991 |
| JP | 04-088586 | 3/1992 |
| JP | 4-88586 | 3/1992 |
| JP | 07-16890 | 7/1995 |
| JP | 10-268960 | 10/1998 |
| JP | 11-053524 | 2/1999 |
| JP | 11-164824 | 6/1999 |
| JP | 2000-322558 | 11/2000 |
| JP | 2000-353235 | 12/2000 |

* cited by examiner

METHOD FOR REMOVING STATIC ELECTRICITY IN FINGERPRINT-READING APPARATUS, FINGERPRINT READING APPARATUS AND DATA TERMINAL PROVIDED WITH FINGERPRINT-READING APPARATUS

FIELD OF THE INVENTION

The invention relates to a method for removing static electricity in a fingerprint-reading apparatus, a fingerprint-reading apparatus and a data terminal provided with a fingerprint-reading apparatus, and especially to a method for removing static electricity in a fingerprint-reading apparatus, a fingerprint-reading apparatus, and a data terminal provided with a fingerprint-reading apparatus, in each of which static electricity stored on a finger of a user is removed when a fingerprint-reading apparatus is used.

Hithereto, a fingerprint-reading apparatus of this kind has been used to improve an accuracy in a fingerprint-reading by preventing a surface which makes contact with a finger for inputting a fingerprint pattern from being dirty or scratched as disclosed in Japanese Patent Application Laid-open No.4-88586.

Figure 1:
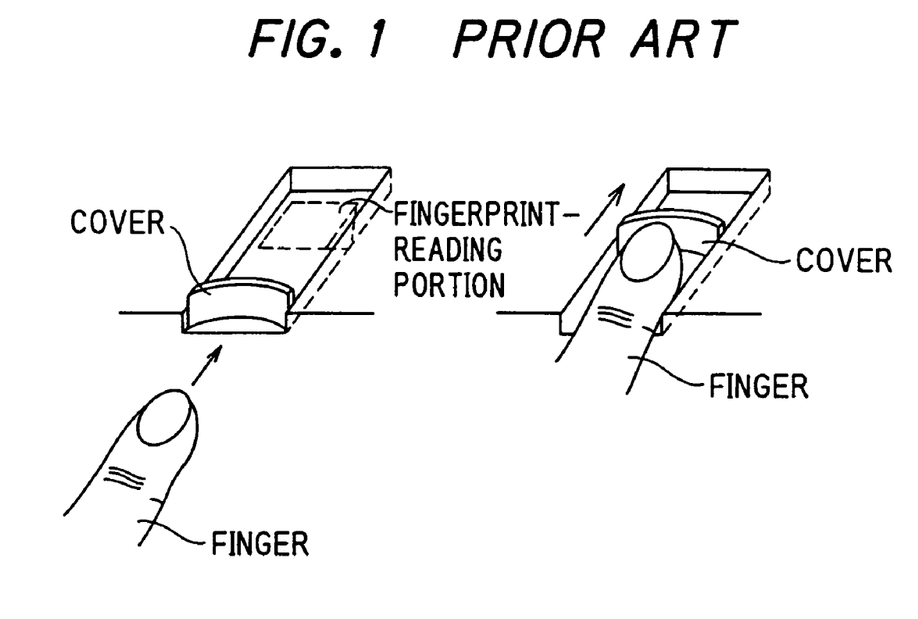
FIG. 1 is a perspective view for showing a conventional fingerprint-reading apparatus.

As shown in FIG. 1, in a conventional fingerprint-reading apparatus, a surface which makes contact with a finger for inputting a fingerprint pattern (a fingerprint-reading portion) is covered with a sliding cover. When a user uses the fingerprint-reading apparatus, he pushes the sliding cover by his finger, and moves his finger to the fingerprint-reading portion to input his fingerprint pattern. In this process, the sliding cover prevents the fingerprint-reading portion from being dirty or scratched, and improves an accuracy in the fingerprint-reading. However, in the aforementioned conventional fingerprint-reading apparatus, if the user makes the fingerprint-reading apparatus read his fingerprint without removing static electricity stored on his finger, there is a possibility that the fingerprint-reading apparatus operates wrongly or is damaged by static electricity.

Moreover, a data terminal uses the fingerprint-reading apparatus built therein to certify a person when the data terminal is used, and the data terminal begins to operates when the fingerprint is certified by the fingerprint-reading apparatus. However, in case that the fingerprint is certified by the fingerprint-reading apparatus, if the fingerprint-reading apparatus is made to read the fingerprint of a finger which is charged with static electricity, there is a possibility that the fingerprint-reading apparatus operates wrongly or is damaged by static electricity stored on the finger.

In the aforementioned conventional fingerprint-reading apparatus, if the finger is moved to the fingerprint-reading portion and the fingerprint is read thereon without removing static electricity stored on the finger, there is a possibility that the fingerprint-reading apparatus operates wrongly or is damaged by static electricity stored on the finger.

In the data terminal provided with the aforementioned conventional fingerprint-reading apparatus, if the finger is put on the fingerprint-reading apparatus and the fingerprint is read thereon in a state that static electricity stored on the finger is not removed in case that the fingerprint is certified by the fingerprint-reading apparatus, there is a possibility that the fingerprint-reading apparatus operates wrongly or is damaged by static electricity stored on the finger.

SUMMARY OF THE INVENTION

Accordingly, it is an object of the invention to provide a method for removing static electricity in a fingerprint-reading apparatus in which static electricity stored on a finger of a user is removed in his movement for putting his finger on a fingerprint-reading portion.

It is a further object of the invention to provide a method for removing static electricity in a fingerprint reading apparatus in which static electricity stored on a finger of a user is removed when he opens a cover of a fingerprint-reading portion.

It is a still further object of the invention to provide a method for removing static electricity in a fingerprint-reading apparatus in which static electricity stored on a finger of a user is removed when he opens a main cover of another apparatus containing a fingerprint-reading apparatus.

It is a yet further object of the invention to provide a fingerprint-reading apparatus in which static electricity stored on a finger of a user is removed when he opens a cover for closing a fingerprint-reading portion.

It is a yet still further object of the invention to provide a fingerprint-reading apparatus in which static electricity stored on a finger of a user is removed when he puts his finger on a plate to open a cover of a fingerprint-reading portion.

It is an additional object of the invention to provide a data terminal provided with a fingerprint-reading apparatus in which static electricity stored on a finger of a user is removed when he opens a cover of a fingerprint-reading portion.

It is an additional further object of the invention to provide a data terminal provided with a fingerprint-reading apparatus in which static electricity stored on a finger of a user is removed when he puts his finger on a plate to open a cover of a fingerprint-reading portion.

It is an additional still further object of the invention to provide a data terminal provided with a fingerprint-reading apparatus in which static electricity stored on a finger of a user is removed when he puts his finger on a lock-releasing button of a main cover of a data terminal.

According to the first feature of the invention, a method for removing static electricity in a fingerprint-reading apparatus provided with a fingerprint-reading portion on which a fingerprint is read in a state that a finger is put thereon, comprises the step of:

removing the static electricity stored on a finger of a user in his movement for putting his finger on a fingerprint-reading portion.

According to the second feature of the invention, a method for removing static electricity in a fingerprint-reading apparatus provided with a fingerprint-reading portion having a cover on which a fingerprint is read in a state that the cover is opened and a finger is put thereon, comprises the step of:

removing the static electricity stored on the finger of a user when the cover is opened.

According to the third feature of the invention, a method for removing static electricity in a fingerprint-reading apparatus which is previously contained in another apparatus and used after the another apparatus is opened, comprises the steps of:

providing a fingerprint-reading portion on which a fingerprint is read in a state that a finger is put thereon for the fingerprint-reading apparatus, and removing the static electricity stored on the finger of a user when the user opens a main cover of the another apparatus.

According to the fourth feature of the invention, a fingerprint-reading apparatus comprises:

a finger-reading portion on which a fingerprint is read in a state that a finger is put thereon, and a cover which closes the fingerprint-reading portion when the fingerprint-reading portion is not used, and is opened by the finger when the finger is put on the fingerprint-reading portion, wherein the cover is formed of conductive material and connected with a ground.

According to the fifth feature of the invention, a fingerprint reading apparatus comprises:

a fingerprint-reading portion on which a fingerprint is read in a state that a finger is put thereon, a cover which closes the fingerprint-reading portion, and a plate on which the finger is put to open the cover, wherein the plate is formed of conductive material and connected with a ground.

According to the sixth feature of the invention, a data terminal which begins to operate when a fingerprint is certified and a start-lock thereof is released, comprises:

a main body provided with the fingerprint-reading apparatus for reading the fingerprint, and a main cover which is provided with a display, shields the fingerprint-reading apparatus and closes the main body when the data terminal is not used, and opens to expose the display bringing a side thereof into contact with the main body when the data terminal is used, wherein the fingerprint-reading apparatus comprises:

a fingerprint-reading portion on which the fingerprint is read in a state that a finger is put thereon, and a cover which closes said fingerprint-reading portion when the fingerprint-reading portion is not used, and is opened by the finger when the finger is put on the fingerprint-reading portion, wherein the cover is formed of conductive material and connected with a ground.

According to the seventh feather of the invention, a data terminal which begins to operate when a fingerprint is certified and a start-lock thereof is released, comprises:

a main body provided with a fingerprint-reading apparatus for reading the fingerprint, and a main cover which is provided with a display, shields the fingerprint-reading apparatus and closes the main body when the data terminal is not used, and opens to expose the display bringing a side thereof into contact with the main body when the data terminal is used, wherein the fingerprint-reading apparatus comprises:

a fingerprint-reading portion on which the fingerprint is read in a state that a finger is put thereon, a cover which closes the fingerprint-reading portion, and a plate on which the finger is put to open the cover, wherein the plate is formed of conductive material and connected with a ground.

According to the eighth feature of the invention, a data terminal which begins to operate when a fingerprint is certified and a start-lock thereof is released, comprises:

a main body provided with a fingerprint-reading apparatus for reading the fingerprint, a main cover which is provided with a display, shields the fingerprint-reading apparatus and closes the main body when the data terminal is not used, and opens to expose the display bringing a side thereof into contact with the main body when the data terminal is used, and a lock-releasing button which locks the main cover relative to the main body so that the main cover closes the main body, and unlocks the main cover in order to open that, wherein the lock-releasing button is formed of conductive material and connected with ground.

BRIEF DESCRIPTION OF THE DRAWINGS

The invention will be explained in more detail in conjunction with the appended drawings, wherein.

DESCRIPTION OF THE PREFERRED EMBODIMENTS

Next, embodiments of the invention will be explained referring to the appended drawings.

Figure 2:
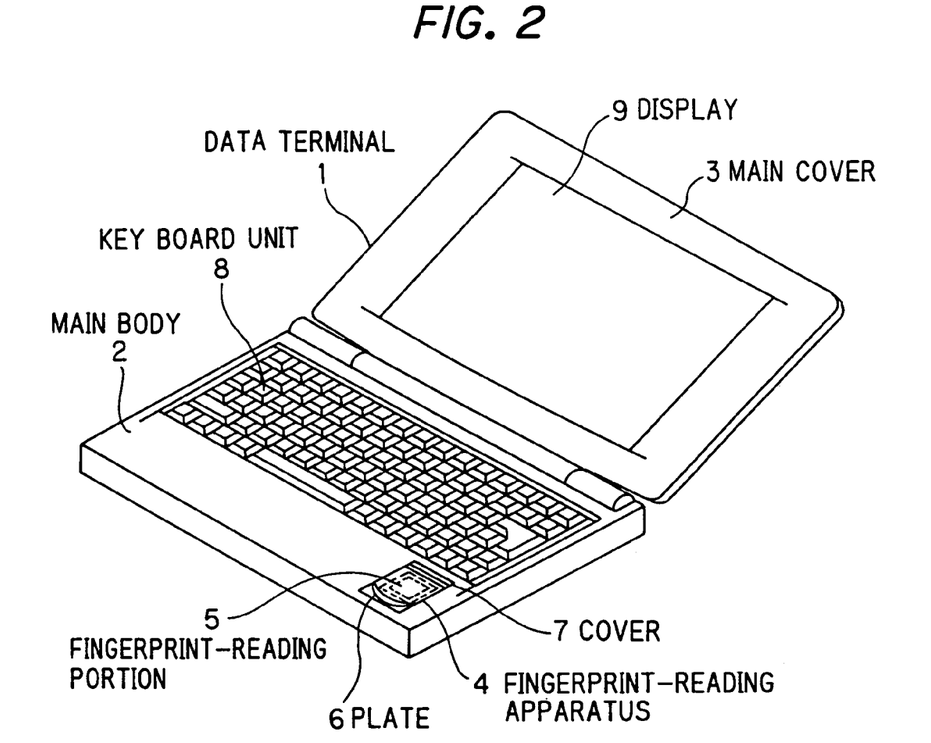
FIG. 2 is a perspective view for showing a data terminal provide with a fingerprint-reading apparatus according to the first preferred embodiment of the invention.

FIG. 2 shows a perspective view for showing a data terminal provided with a fingerprint-reading apparatus according to the first preferred embodiments of the invention.

The embodiment shown in FIG. 2 begins to operate when a start-lock thereof is released by certifying a fingerprint of a user by means of the fingerprint-reading apparatus 4. The data terminal 1 is composed of a main body 2 provided with the fingerprint-reading apparatus 4, a key board unit 8, etc. and a main cover 3 which is opened and closed at will and provided with a display 9 formed of a LCD etc. When the data terminal 1 is not used, the main cover 3 shields the fingerprint-reading apparatus 4, the key board unit 8, etc. and closes the main body 2. When the data terminal 1 is used, the main cover 3 opens to expose the display 9 bringing a side thereof into contact with the main body 2.

The fingerprint-reading apparatus 4 is composed of a fingerprint-reading portion 5 on which the fingerprint is read in a state that a finger is put thereon, a cover 7 for closing the fingerprint-reading portion 5, and a plate 6 which is formed of conductive material and connected with the ground, wherein conductive material is conductive resin, metal, etc. The finger is put on the plate 6 when the cover 7 is opened.

Next, an operation of a data terminal 1 provided with the fingerprint-reading apparatus 4 according to the invention will be explained referring to FIGS. 3 and 4.

Figure 3:
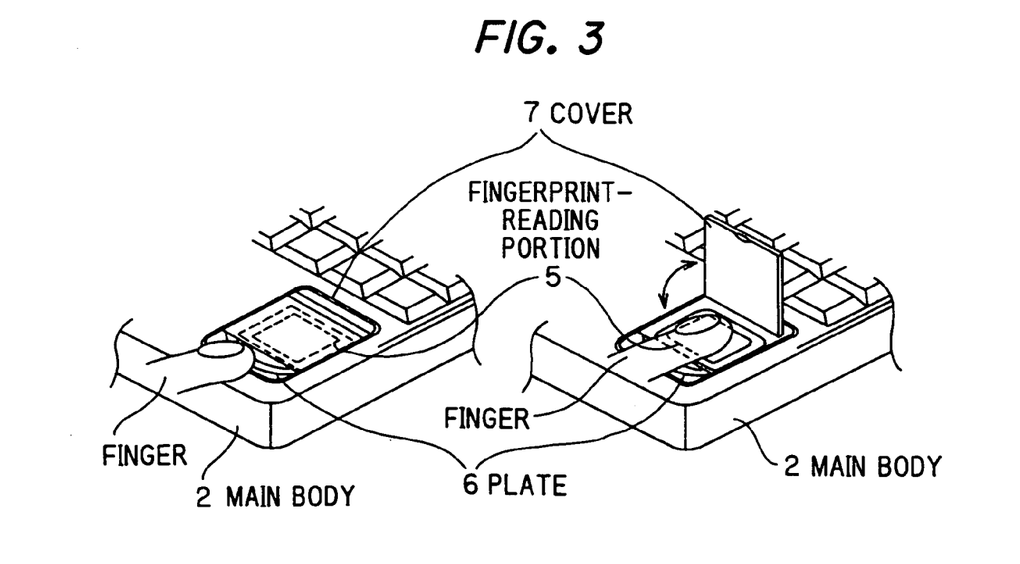
FIG. 3 shows states of a fingerprint-reading apparatus before and after a cover thereof is opened.

FIG. 3 shows examples of the states of the fingerprint-reading apparatus 4 before and after the cover 7 is opened, and a user puts his finger on the plate 6 which is formed of conductive material and connected with the ground, when he opens the cover 7 in a direction shown by an arrow in case that the fingerprint is read by the fingerprint-reading apparatus 4. At this time, static electricity stored on his finger is conducted to the ground via the plate 6. The user puts his finger on the fingerprint-reading portion 5 after he opens the cover 7 by pushing up it by his finger or progressing his finger, and the fingerprint is read on the fingerprint-reading portion 5. Accordingly, the user is not aware of his action for removing static electricity stored on his finger during his movement for putting his finger on the fingerprint-reading portion 5, and static electricity is already removed from his finger when he puts his finger on the fingerprint-reading portion 5.

Figure 4:
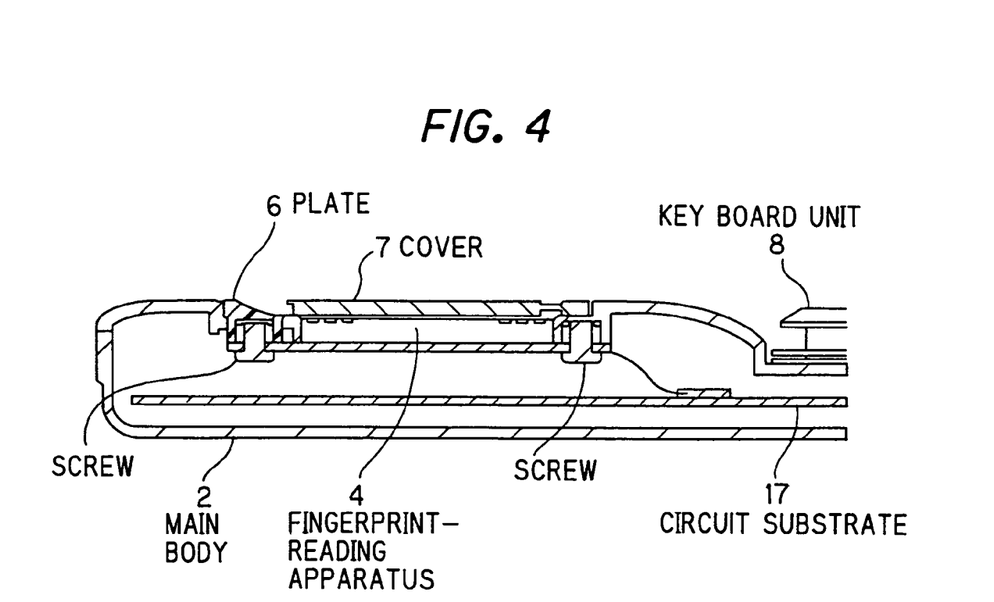
FIG. 4 is a cross-sectional view of a data terminal shown in FIG. 2 in case that a main cover thereof is closed.

FIG. 4 shows an example of a cross-section of the main body of the data terminal provided with the fingerprint-reading apparatus. The plate 6 is fixed to the fingerprint-reading apparatus 4 by screws, springs, etc. in the inside of the main body 2, and connected with the ground via a circuit substrate 17 etc.

As shown in FIG. 2, when the user uses the data terminal 1, he opens the main cover 3 to expose the display 9. After a power supply (not shown) of the data terminal 1 is turned on, the fingerprint is certified in order to release the start-lock of the data terminal 1. That is to say, first, the cover 7 which has closed the fingerprint-reading portion 5 of the fingerprint-reading apparatus 4 is opened as shown in FIG. 3. Since the cover 7 is so constructed that it is opened in the direction shown by an arrow shown in FIG. 3, the user must put his finger on the plate 6 when the cover 7 is opened. Since the plate 6 is connected with the ground via the fingerprint-reading apparatus 4 as shown in FIG. 4, static electricity stored on his finger can be conducted to the ground via the plate 6 even in case that the finger is strongly charged with static electricity. Next, as shown in FIG. 3, the finger which is not charged with static electricity is put on the fingerprint-reading portion 5, and the fingerprint is read and certified at this position. When the fingerprint is certified, the start-lock is released and the data terminal 1 begins to operate. Accordingly, the user is not aware of his action for removing static electricity stored on his finger during his movement for putting his finger on the fingerprint-reading portion 5, and static electricity stored on his finger is removed. Since static electricity stored on his finger has been already removed when the user puts his finger on the fingerprint-reading portion 5, the fingerprint-reading apparatus 4 does not operate wrongly or is not damaged. Moreover, since the fingerprint-reading apparatus 4 is provided with the cover 7, the fingerprint-reading apparatus 4 is prevented from being dirty or scratched.

In the aforementioned description, although the plate 6 on which the user puts his finger in case that he opens the cover 7 is formed as an independent structural element and static electricity stored on his finger is conducted to the ground via the plate 6, a similar effect can be obtained by such a structure that a part of a casing on which he puts his finger when he opens the cover 7 is formed of conductive material, such as conductive resin or metal, and connected with the ground. Moreover, a similar effect can be obtained by a structure mentioned as follows. That is to say, a fingerprint-reading apparatus 4 is composed of a fingerprint-reading portion 5 which reads a fingerprint in a state that a finger is put thereon and a cover 7 which closes the fingerprint-reading portion 5 and is formed of conductive material, such as conductive resin or metal, and connected with the ground. The cover 7 is opened by the finger of a user, when the finger is put on the fingerprint-reading portion 5 and the fingerprint is read thereon. When the user opens the cover 7 by his finger, static electricity stored on his finger is conducted to the ground via the cover 7. When the user puts his finger on the fingerprint-reading portion 7, the static electricity stored on his finger has been already conducted to the ground. The cover is connected with the fingerprint-reading apparatus 4 in the inside of the main body 2 and communicated with the ground via the circuit substrate 17 in the data terminal 1.

Figure 5:
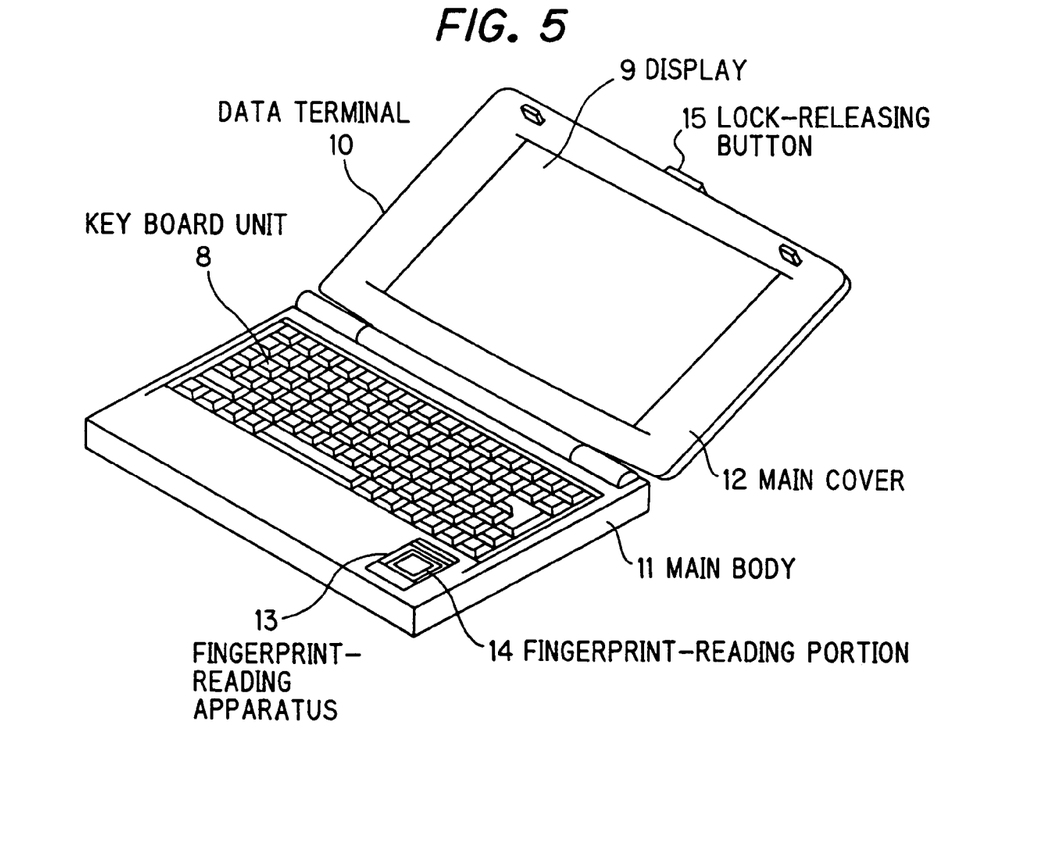
FIG. 5 is a perspective view for showing a data terminal according to the second preferred embodiment of the invention provided with a fingerprint-reading apparatus.

FIG. 5 is a perspective view for showing a data terminal provided with a fingerprint-reading apparatus according to the second preferred embodiment of the invention.

The embodiment shown in FIG. 5 is a data terminal 10 provided with a fingerprint-reading apparatus 13, which release a start-lock of the data terminal 10 by certifying a fingerprint. The data terminal 10 is composed of a main body 11 which is provided with a fingerprint-reading apparatus 13 for reading a fingerprint, a key board unit 8, etc., a main cover 12 provided with a display 9 formed of a LCD etc., and a lock-releasing button 15 which is formed of conductive material and connected with the ground. When the data terminal 10 is not used, the main cover 12 shields the fingerprint-reading apparatus 13, the key board unit 8, etc., and closes the main body 11. When the main body 10 is used, the main cover 12 opens to expose the display 9 bringing a side thereof into contact with the main body 11. The lock-releasing button 15 locks the main cover 12 relative to the main body 11 which is closed by the main cover 12, and unlocks the main cover 12 to open the same. The lock-releasing button 15 is formed of plastic containing carbon fibers, metal, etc.

Next, an operation of the data terminal 10 provided with the fingerprint-reading apparatus 13 will be explained referring to FIGS. 6 and 7.

Figure 6:
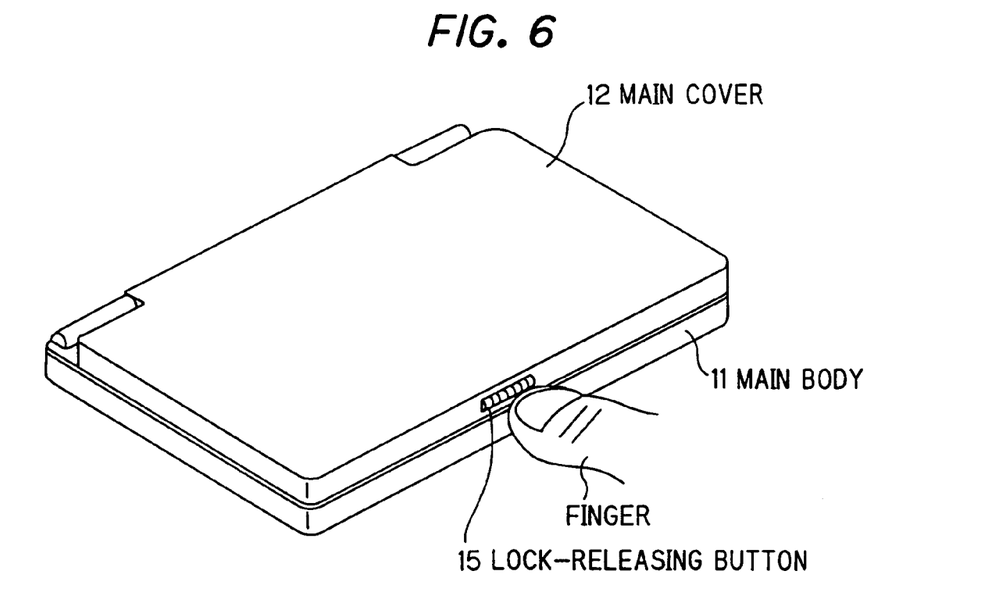
FIG. 6 is a perspective view for showing a data terminal shown in FIG. 5 in case that a main cover thereof is closed.

FIG. 6 is a perspective view for showing an example of the data terminal 10 in case that it does not operate, and the main cover 12 is locked relative to the main body 11 which is closed by the main cover 12.

Figure 7:
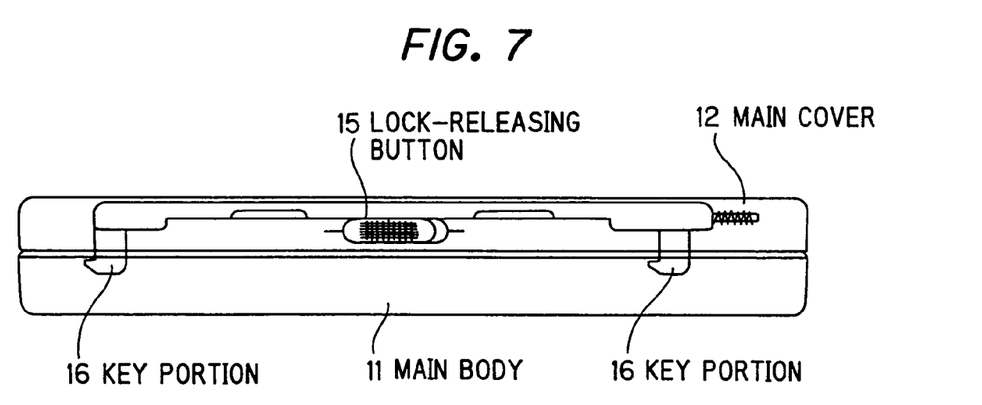
FIG. 7 shows an example of a structure of a lock releasing button used in a data terminal shown in FIG. 5.

FIG. 7 shows an example of a structure of a lock-releasing button 15 combined with the data terminal 10. In a state shown in FIG. 7, the data terminal 10. In a state shown in FIG. 7, the data terminal 10 is not used, and the main cover 12 closes the main body 11 and is locked relative to the main body 11. The lock-releasing button 15 which is formed of conductive material and connected with the ground via the data terminal 10 is provided with key portions 16 situated near the right and left ends of the data terminal 10. The key portions 16 move to right and left linked up with a lateral movement of the lock-releasing button 15. Accordingly, when the lock-releasing button 15 is slid to right by the finger to remove the key portions 16 from the main body 11, the lock of the main cover 12 is released, and the cover 12 opens to expose the display 9. Since the lock of the main cover 12 is released by sliding the lock-releasing button 15 and the main cover 12 is opened, static electricity stored on the finger of the user is conducted to the ground via the data terminal 10.

In FIG. 5, when the user uses the data terminal 10, he opens the main cover 12 which closes the main body 11 when the data terminal 10 is not used by the operation shown in FIG. 7 to expose the display 9. At this time, since he slides the lock-releasing button 15 by his finger as shown in FIG. 7, static electricity stored on his finger is conducted to the ground via the data terminal 10. Then, the fingerprint is certified and the start-lock of the data terminal 10 is released after a power supply (not shown) of the data terminal 10 is turned on. That is to say, he puts his finger which is not charged with static electricity on the fingerprint-reading portion 14, and the fingerprint is certified. When the fingerprint is certified, the start-lock of the data terminal 10 is released, and the user uses the same. Accordingly, the user is not aware of his action for removing static electricity stored on his finger during his movement for putting his finger on the fingerprint-reading portion 14, and static electricity stored on his finger is removed. Since static electricity stored on his finger has been already removed when he puts his finger on the fingerprint-reading portion 14, the fingerprint-reading apparatus 13 does not operate wrongly or is not damaged.

In the above descriptions, although explanations are given on a case that the data terminal 1 or 10 is a personal digital assistance, the application of the invention is never restricted to the personal digital assistance. For example, the invention can be applied to a personal computer or a workstation which is provided with a fingerprint-reading apparatus and begins to operate after the fingerprint is certified and the start-lock thereof is released.

As mentioned in the above, the fingerprint-reading apparatus is composed of the fingerprint-reading portion on which the fingerprint is read in a state that the finger is put thereon and the cover for closing the fingerprint-reading portion. The cover is formed of conductive material and connected with the ground. When the user puts his finger on the fingerprint-reading portion, he opens the cover by his finger, and static electricity stored on his finger is conducted to the ground via the cover.

Moreover, the fingerprint-reading apparatus of another type is composed of the fingerprint-reading portion on which the fingerprint is read in a sate that finger is put thereon, the cover for closing the fingerprint-reading portion, and a plate on which the user puts his finger to open the cover. The plate is formed of conductive material, and connected with the ground. When the user opens the cover of the fingerprint-reading portion by his finger, he puts his finger on the plate, and static electricity stored on his finger is conducted to the ground via the plate.

Accordingly, static electricity stored on the finger of the user is conducted to the ground in a state that he is not aware of his action for removing static electricity stored on his finger during his movement for putting his finger on the fingerprint-reading portion. Since static electricity is already removed from his finger when he puts his finger on the fingerprint-reading portion, the fingerprint-reading apparatus is prevented from operating wrongly or being damaged. Moreover, since the fingerprint-reading apparatus is prevented from being dirty or scratched.

In the data terminal provided with the fingerprint-reading apparatus according to the invention, which releases the start-lock thereof and begins to operated after the fingerprint is certified, is composed of the main body provided with the fingerprint-reading apparatus and the main cover provided with the display.

The main cover shields the fingerprint-reading apparatus and closes the main body when the data terminal is not used, and opens to expose the display bringing a side thereof into contact with the main body when the data terminal is used.

The fingerprint-reading apparatus is composed of the fingerprint-reading portion on which the fingerprint is read in a state that the finger is put thereon and the cover with closes the fingerprint-reading portion. The cover is formed of conductive material and connected with the ground. When the user puts his finger on the fingerprint-reading portion, he opens the cover by his finger, and static electricity stored on his finger is conducted to the ground via the cover.

The fingerprint-reading apparatus of another type is composed of the fingerprint-reading portion on which the fingerprint is read in a state that the finger is put thereon, the cover for closing the fingerprint-reading portion, and the plate on which the user puts his finger to open the cover. The plate is formed of conductive material and connected with the ground. When the user opens the cover by his finger, he puts his finger on the plate, and static electricity stored on his finger is conducted to the ground via the plate.

Accordingly, static electricity stored on his finger is conducted to the ground in a sate that he is not aware of his action for removing static electricity stored on his finger during his movement for putting his finger on the fingerprint-reading portion. Since static electricity is already removed from his finger when he puts his finger on the fingerprint-reading portion, the fingerprint-reading apparatus is prevented from operating wrongly or being damaged.

Moreover, the data terminal provided with the fingerprint-reading apparatus according the invention which release the start-lock thereof and begins to operate after the fingerprint is released is composed of the main body provided with the fingerprint-reading apparatus, the main cover provided with the display, and the lock-releasing button for releasing the lock of the main cover.

The main cover shields the fingerprint-reading apparatus and closes the main body when the data terminal is not used, and opens to expose the display bringing a side thereof into contact with the main body when the data terminal is used.

The lock-releasing button locks the main cover relative to the main body when the data terminal is not used, and unlocks the main cover from the main body when the data terminal is used. The lock-releasing button is formed of conductive material and connected with the ground.

Accordingly, since static electricity stored on his finger is conducted to the ground via the lock-releasing button when the user opens the main cover of the data terminal, static electricity stored on his finger is removed in a state that he is not aware of his action for removing static electricity stored on his finger during his movement for putting his finger on the fingerprint-reading portion. Since static electricity stored on his finger has been already removed from his finger when the user puts his finger on the fingerprint-reading portion, the fingerprint-reading apparatus is prevented from operating wrongly or being damaged.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A method for removing static electricity in a fingerprint-reading apparatus provided with a fingerprint-reading portion on which a fingerprint is read in a state that a finger is put thereon, comprising the step of:

removing said static electricity stored on a finger of a user through a plate on said fingerprint-reading apparatus adjacent said fingerprint-reading portion prior to putting his finger on a fingerprint-reading portion while obtaining access to said fingerprint-reading portion by movement of a structure for covering said fingerprint-reading portion when not in use wherein said cover and said plate are formed of conductive material and connected with a ground.

2. A method for removing static electricity in a fingerprint-reading apparatus, said apparatus being provided with a fingerprint-reading portion and having a cover, on which a fingerprint is read in a state that said cover is opened and a finger is put thereon, comprising the step of:

removing said static electricity stored on said finger of a user through a plate adjacent said cover when said cover is opened wherein said cover and said plate are formed of conductive material and connected with a ground.

3. The method for removing static electricity as defined in claim 2, wherein said step of removing said static electricity comprises the steps of:
   forming said cover of conductive material,
   connecting said cover with a ground, and
   conducting static electricity to a ground via said cover when said cover is opened by said finger of said user.

4. The method for removing static electricity as defined in claim 2, wherein:
   said step of removing said static electricity comprises the steps of:
   providing a plate formed of conductive material for said fingerprint-reading apparatus,
   situating said plate on a position on which said user puts said finger to open said cover,
   connecting said plate with a ground, and
   conducting said static electricity stored on said finger of said user to said ground via said plate.

5. A method for removing static electricity in a fingerprint-reading apparatus which is contained in another apparatus and used after said another apparatus is opened, comprising the step of:
   providing fingerprint-reading portion on which a fingerprint is read in a state that a finger is put thereon for said fingerprint-reading apparatus, and
   removing said static electricity stored on said finger of a user through a conductive device which is connected to ground and on which a finger is placed when said user opens a main cover of said another apparatus wherein said conductive device is formed of conductive material and connected with a ground.

6. The method for removing static electricity as defined in claim 5, wherein:
   said another apparatus is provided with a lock-releasing button which is formed of conductive material and connected with a ground, and
   said static electricity stored on said finger is removed via a lock-releasing button when said user opens said main cover of said another apparatus.

7. A fingerprint-reading apparatus, comprising:
   a finger-reading portion on which a fingerprint is read in a state that a finger is put thereon,
   a cover which closes said fingerprint-reading portion when said fingerprint-reading portion is not used, and is opened by said finger when said finger is put on said fingerprint-reading portion, and
   a plate electrically connected with a ground and positioned adjacent said cover such that said plate is touched by said finger prior to said finger touching said fingerprint-reading portion as said cover is opened,
   wherein said cover is formed of conductive material and connected with a ground.

8. The fingerprint-reading apparatus as defined in claim 7, wherein:
   said conductive material is conductive resin.

9. The fingerprint-reading apparatus defined in claim 7, wherein:
   said conductive material is metal.

10. A fingerprint-reading apparatus, comprising:
    a fingerprint-reading portion on which a fingerprint is read in a state that a finger is put thereon,
    a cover which closes said fingerprint-reading portion, and
    a plate on which said finger is put to open said cover, wherein said plate is formed of conductive material and connected with a ground.

11. The apparatus as defined in claim 10, wherein:
    said conductive material is conductive resin.

12. The fingerprint-reading apparatus as defined in claim 10, wherein:
    said conductive material is metal.

13. A data terminal which begins to operate when a fingerprint is certified and a start-lock thereof is released, comprising:
    a main body provided with said fingerprint-reading apparatus for reading said fingerprint, and
    a main cover which is provided with a display, shields said fingerprint-reading apparatus and closes said main body when said data terminal is not used, and opens to expose said display bringing a side thereof into contact with said main body when said data terminal is used,
    wherein said fingerprint-reading apparatus comprises:
    a fingerprint-reading portion on which said fingerprint is read in a state that a finger is put thereon,
    a cover which closes said fingerprint-reading portion when said fingerprint-reading portion is not used, and is opened by said finger when said finger is put on said fingerprint-reading portion, and
    a plate adjacent said cover,
    wherein said cover and said plate are formed of conductive material and connected with a ground.

14. The data terminal as defined in claim 13, wherein said conductive material is a conductive resin.

15. The data terminal as defined in claim 13, wherein said conductive material is a metal.

16. A data terminal which begins to operate when a fingerprint is certified and a start-lock thereof is released, comprising:
    a main body provided with a fingerprint-reading apparatus for reading said fingerprint, and
    a main cover which is provided with a display, shields said fingerprint-reading apparatus and closes said main body when said data terminal is not used, and opens to expose said display bringing a side thereof into contact with said main body when said data terminal is used,
    wherein said fingerprint-reading apparatus comprises:
    a fingerprint-reading portion on which said fingerprint is read in a state that a finger is put thereon,
    a cover which closes said fingerprint-reading portion, and
    a plate on which said finger is put to open said cover,
    wherein said plate is formed of conductive material and connected with a ground.

17. The data terminal as defined in claim 16, wherein: said conductive material is conductive resin.

18. The data terminal as defined in claim 16, wherein: said conductive material is metal.

19. A data terminal which begins to operate when a fingerprint is certified and start-lock thereof released, comprising:
    a main body provided with a fingerprint-reading apparatus for reading said finger print,
    a main cover which is provided with a display, shields said fingerprint-reading apparatus and closes said main body when said data terminal is not used, and opens to expose said display bringing a side thereof into contact with said main body when said data terminal is used, and
    a lock-releasing button which locks said main cover relative to said main body when said data terminal is used, and a lock-releasing button which locks said main cover relative to said main body so that said main cover closes said main body, and unlocks said main cover in order to open that, wherein said lock-releasing button is formed of conductive material and connected with ground.

20. The data terminal as defined in claim 19, wherein:
said conductive material is plastic containing carbon fibers therein.

* * * * *